May 15, 1923.
C. C. PFLITTNER
SHOCK ABSORBER
Filed Feb. 5, 1921
1,455,121
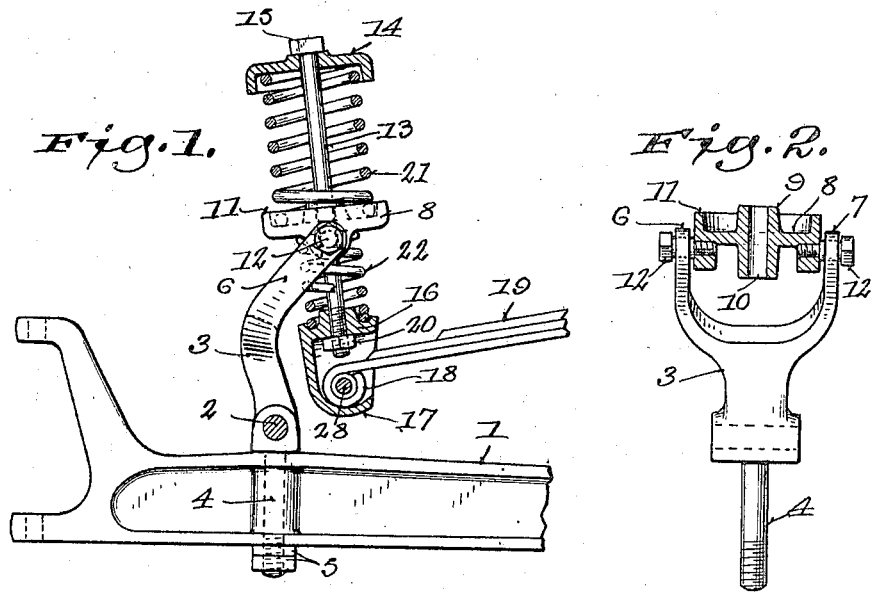
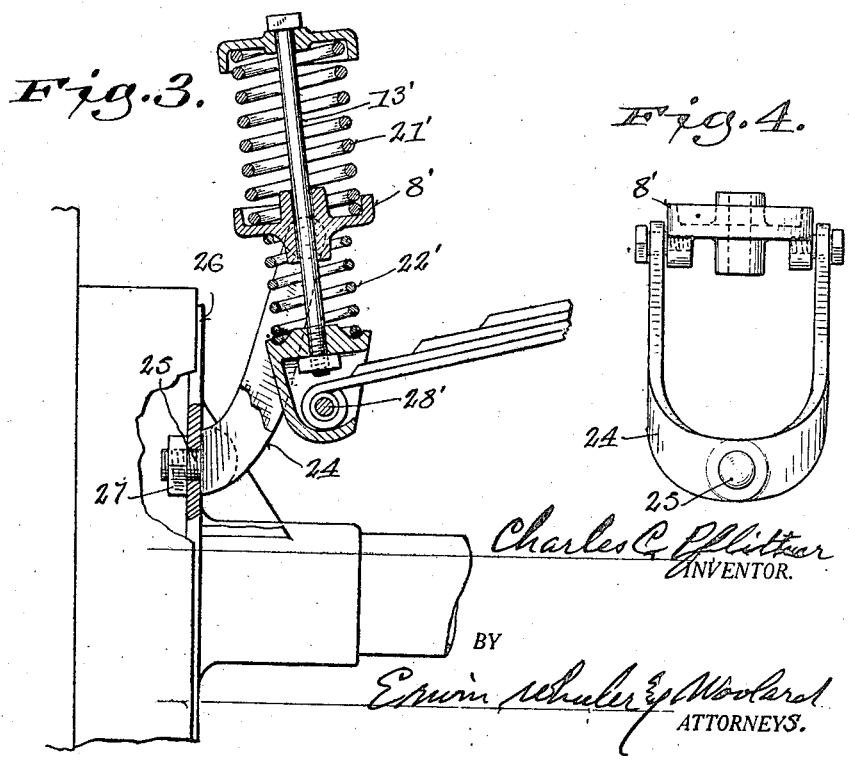

Patented May 15, 1923.

1,455,121

UNITED STATES PATENT OFFICE.

CHARLES C. PFLITTNER, OF BARTON, WISCONSIN.

SHOCK ABSORBER.

Application filed February 5, 1921. Serial No. 442,708.

*To all whom it may concern:*

Be it known that I, CHARLES C. PFLITTNER, a citizen of the United States, residing at Barton, county of Washington, and State of Wisconsin, have invented new and useful Improvements in Shock Absorbers, of which the following is a specification.

This invention relates to shock absorbers and is particularly directed to a shock absorber to be placed between the main springs and the truck portion of an automobile.

Objects of this invention are to provide a shock absorber which will prevent the direct transmission of shocks; to provide a shock absorber which will smooth out the rapid, smaller shocks before they reach the main springs; which will lessen the larger shocks and transform them into a more nearly cushioned impulse as distinguished from a direct blow and which will cushion the rebound.

Further objects are to provide a shock absorber which may replace the usual spring brackets, which will retain the main springs in approximately correct position altho the smaller springs of the shock absorber may break, and which will retain the main springs in position even if the pivot pin of the shock absorber should break.

Further objects are to provide a shock absorber which will readily pivot about its point of support to accommodate various movements of the body of the car; which will prevent binding of any of its parts, and which is of simple design and of easy application.

An embodiment of the invention is shown in the accompanying drawings, in which:

Fig. 1 is a side elevation partly in section of one of the front shock absorbers.

Fig. 2 is a detail partly in section of the structure shown in Fig. 1.

Fig. 3 is an elevation partly in section of one of the rear shock absorbers.

Fig. 4 is a detail of the structure shown in Fig. 3.

In the drawings, the invention has been illustrated as applied to a Ford car in which 1 represents the front axle and 2 the radius rod. The usual spring bracket is replaced by a forked bracket 3 having an opening to receive the radius rod and having a projecting stem 4 which passes thru the usual opening in the front axle, the lower portion of the projecting stem being threaded and receiving a pair of nuts 5, one of which acts as a locking nut. The upper portion of the forked bracket 3 carries between its two arms 6 and 7 a cup-shaped member 8 having a central hub 9 provided with an opening 10 therethru. This cup-shaped member 8 has screwed into its outer flange 11 a pair of shouldered, headed screws 12 which pivot in the arms 6 and 7 of the bracket 3, turning, of course, with the cup-shaped member 8. A central rod 13 passes thru the opening 10 and carries at its upper end an inverted cup shaped cap 14 which bears against the upper head 15 of the rod 13. The lower end of the rod 13 is threaded and passes thru a socket member 16 whose inner side is open and whose bottom portion 17 is curved inside so as to conform to the curvature of the eye 18 of the main spring 19 of the vehicle. A nut 20 is threaded upon the lower end of the rod 13 and retains the socket 16 in position. Also, the tightening of this nut will regulate the tension of the main compression spring 21 and of the rebound compression spring 22.

Fig. 3 shows the construction of shock absorber adapted for the rear portion of the vehicle. In this form, the springs, cup-shaped member, and sockets are the same as in the former case. The bracket 24, however, has an outwardly turned portion provided with a threaded stem 25 adapted to pass thru the brake housing 26 and to receive a clamping nut 27 to position such bracket.

By forming the cup-shaped members 8 and 8' with an elongated hub projecting above and below the central web, an elongated bearing is provided for the main rod 13 or 13' so that such rod may readily tilt the cup-shaped member without binding. Also, these hubs aid in positioning the springs 20, 21', 22, 22'.

If either of the compression springs should break, the main springs will still be retained in approximately correct position as the rod 13 or 13' cannot become detached from the correspondingly pivotally mounted cup-shaped member. Also, it will be noted that if the pivot pin 28 or 28' which normally receives the eye of the main spring should break, the main spring will merely bear against the inner curved portion of the bottom part of the socket member and be retained in position.

By providing a lighter spring 22 or 22' below the corresponding pivotal socket member, periodic vibration is very much reduced as the natural period of the two springs will be different and this, coupled with the natural period of the main springs, will tend to produce a choking out of periodic vibrations resulting from any one disturbance. Also, the lighter bottom springs cushion the rebound and prevent a large number of successive rebounds after one disturbance. The upper compression springs receive and absorb the rapid minor vibrations and prevent their transmission, or at least materially lessen their transmission, to the main springs of the vehicle and consequently to the body. The heavier shocks are cushioned and are not instantly transmitted to the main springs, but are transmitted in a more gradual manner thru the medium of the shock absorber springs.

It will also be seen that a relatively simple, easily produced, and easily applied shock absorber has been provided which may be cheaply manufactured and which will be effective in operation.

I claim:

1. A shock absorber comprising a fork-shaped member adapted to be attached to a portion of the chassis of an automobile, an apertured member pivotally mounted within said stationary fork-shaped member, a rod provided with a sliding bearing in the apertured member, a spring positioned upon each side of said apertured member and surrounding said rod, means for operatively connecting said rod with the outer ends of the springs, and means for connecting the lower end of said rod with the eye of an automobile spring.

2. A shock absorber for an automobile comprising a stationary fork-shaped member adapted to be secured to a portion of the chassis of the automobile, a centrally apertured member pivotally mounted within the fork and provided with an elongated hub surrounding the aperture and intersected by the pivotal axis about which said member is rotatable, a rod slidably journaled in said hub and extending upon opposite sides of said member, a pair of springs of different characteristics positioned upon opposite sides of said apertured member and operatively connected at their outer ends with said rod, one of said springs seating about said elongated hub in the apertured member, an outwardly turned flange formed integrally with said apertured member and surrounding the inner end of the other spring, and means for connecting the eye of a main spring of the automobile with one end of said rod.

3. In combination, a bearing member, a relatively heavy spring above said member, a relatively light spring below said member, means for engaging said springs at their ends and compressing both against said member, means for attaching the free end of a vehicle spring to said spring engaging means, a bracket adapted for connection to the running gear of the vehicle, and means for pivotally mounting said bearing member on the bracket.

CHARLES C. PFLITTNER.